United States Patent [19]
Roberts et al.

[11] Patent Number: 5,290,983
[45] Date of Patent: Mar. 1, 1994

[54] WALL SWITCH

[75] Inventors: Lincoln E. Roberts, Decatur; Dale E. Thomas, Stone Mountain, both of Ga.

[73] Assignee: The Whitaker Corporation, Wilmington, Del.

[21] Appl. No.: 60,113

[22] Filed: May 10, 1993

Related U.S. Application Data

[63] Continuation of Ser. No. 739,564, Aug. 2, 1991, abandoned.

[51] Int. Cl.⁵ .......................................... H01H 21/24
[52] U.S. Cl. ...................... 200/557; 200/292; 200/295; 200/553
[58] Field of Search ............ 200/295, 292, 553, 556, 200/557, 315, 333, 317, 293; 361/397, 399, 417

[56] References Cited

U.S. PATENT DOCUMENTS

| | | | |
|---|---|---|---|
| 2,434,065 | 1/1948 | Courtney | 200/315 |
| 2,794,890 | 6/1957 | Taylor | 200/553 X |
| 2,924,681 | 2/1960 | Schmidt | 200/557 |
| 3,582,584 | 6/1971 | Best | 200/556 |
| 4,425,487 | 1/1984 | Hsieh | 200/557 |
| 4,639,054 | 1/1987 | Kersberger | 200/292 X |
| 4,758,724 | 7/1988 | Osika | 200/317 X |
| 4,778,967 | 10/1988 | Derg | 200/315 |
| 4,883,932 | 11/1989 | Van Hout et al. | 200/557 X |
| 5,036,168 | 7/1991 | Kihuchi et al. | 200/295 X |
| 5,053,592 | 10/1991 | Zuerches | 200/553 |
| 5,068,639 | 11/1991 | Swanson et al. | 200/252 X |
| 5,079,395 | 1/1992 | Barnard et al. | 200/557 |
| 5,107,082 | 4/1992 | Valerzona | 200/292 |

FOREIGN PATENT DOCUMENTS

40819  2/1990  Japan .................................. 200/553

*Primary Examiner*—Glenn T. Barrett

[57] ABSTRACT

A wall switch (12) includes a face plate body (14) containing an aperture (20) and wall projections (22, 23, 24) carrying an actuator rocker (30) with a board (40) carrying switch contacts (58) momentarily closed by the rocker to effect a closure of circuits carried on the board and interconnected to a cable (88) through terminals in a connector (44) carried on the board and a connector (80) carried by the cable.

11 Claims, 3 Drawing Sheets

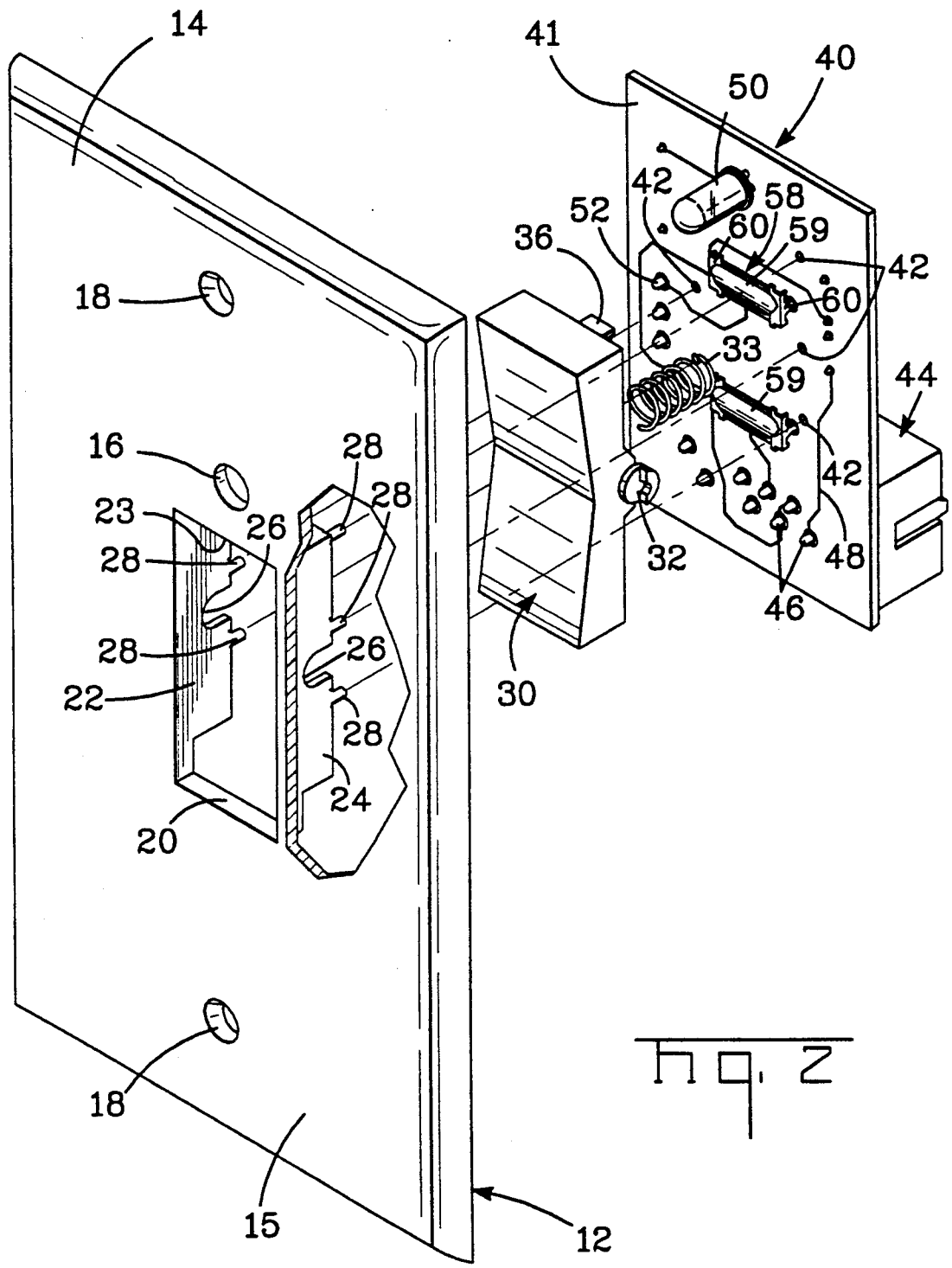

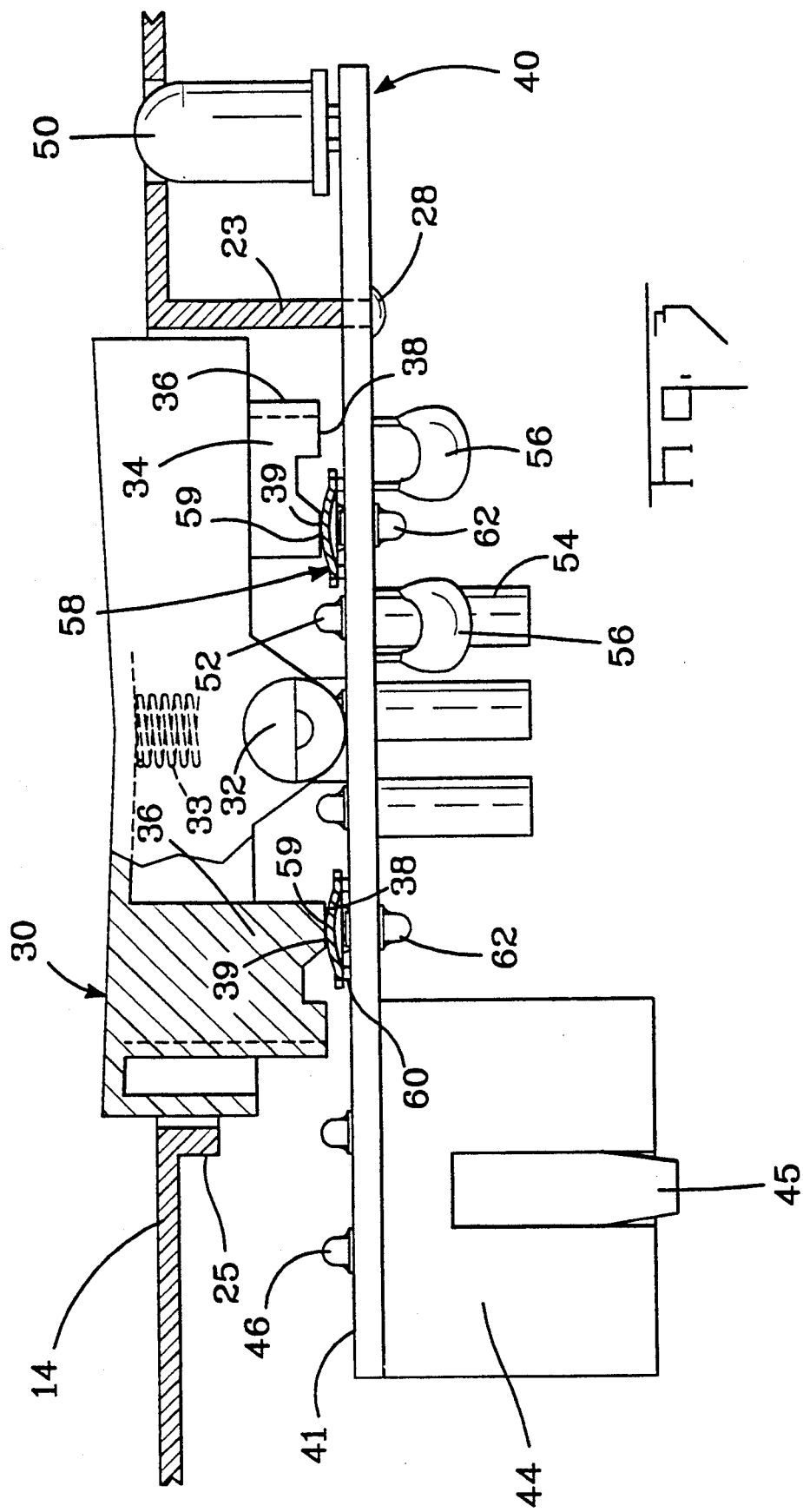

WALL SWITCH

This application is a continuation of application Ser. No. 07/739,564 filed Aug. 2, 1991, now abandoned.

This invention relates to a wall switch of the type utilized to turn on and turn off lamps and other loads in building structures.

BACKGROUND OF THE INVENTION

In intelligent wiring systems used for light frame structures such as houses and buildings under three stories, switches are employed which do not directly switch the power required by devices such as lights and switched outlets and the like. Rather, low level signals are generated which can be detected by the central or local controller for the system which in turn can operate solid state power switches, or relays, or solenoids to effect power switching. Switches frequently operate in several different modes and frequently require electronic components having parameters to provide pulses of desirable characteristics; capacitors, resistors, diodes and display lamps. This calls for an assembly of elements located at a given switch point which can lead to numerous small components, switches, connectors, fasteners and anchors and face plates and the like, as well as brackets and boxes which all must be properly assembled to provide a proper function. This in turn adds a cost and installation complexity for the craftsmen which is undesirable and can lead to delays and mistakes in installing intelligent wiring.

Accordingly, it is an object of the present invention to provide a switch for intelligent wiring of buildings wherein the various elements required are preassembled as a single handleable unit. It is yet a further object to provide a novel switch structure incorporated into the necessary decorative face plate of the switch utilizing the plastic material of the face plate to support switch elements. It is still a further object to provide a face plate incorporating switch elements and simple, conventional components for use in an intelligent switching function.

SUMMARY OF THE INVENTION

The present invention achieves the foregoing objectives by providing a plastic molded face plate which includes on the outer surface a decorative and attractive finish. The face plate covers a hole in a wall into which the face plate is mounted. In the center of the planar area of the face plate is an aperture for an actuator such as a rocker, which aperture leads directly to wall projections extending from the rear of the face plate and made of the material of the face plate and integral therewith. These wall projections form an open ended box configuration. The rocker fits within the box formed projections and a printed circuit board carrying components and a connector is mounted on such projections to form a one-piece assembly which may be handled, inventoried and installed in a straightforward and simplified manner. The printed circuit board, in accordance with the invention, further includes switch contacts which are spring elements and oriented to be engaged by projections on the actuator rocker to be temporarily closed to in turn establish a circuit path developing a signal to a localized or central controller to effect a switching function. A pair of spring contacts are provided and serve to center the actuator rocker when pressure thereupon by an operator is removed, the actuator rocker being trapped between bearing surfaces in the projections and the contacts mounted on the printed circuit board. The projections include plastic elements which fit through the board and which are ultrasonically or heat staked to attach the board to the wall box projections and to the face plate. The printed circuit board is made to carry a multi-pin connector which can be plugged into a connector attached to a cable, either at its end or in the middle thereof, such cable carrying signal wires to a local or central controller for the intelligent wiring system. The printed circuit board may further contain circuits connected to capacitors, resistors, and diodes, including a light emitting diode which, in one mode of operation, indicates that the switch is in such mode of operation and is in the "on" condition. The provision of a momentary switch action of one or the other of two contacts, simplifies the intelligent wiring system's circuit in that the switch does not have to be latched in one position or the other.

IN THE DRAWINGS

FIG. 2 is a perspective, exploded and partially sectioned to show the switch face plate actuator rocker and printed circuit board assembly.

FIG. 3 is a side, elevational view, partially sectioned, of the switch assembly shown in FIG. 2 as assembled.

DETAILED DESCRIPTION OF THE INVENTION

Figure 1:
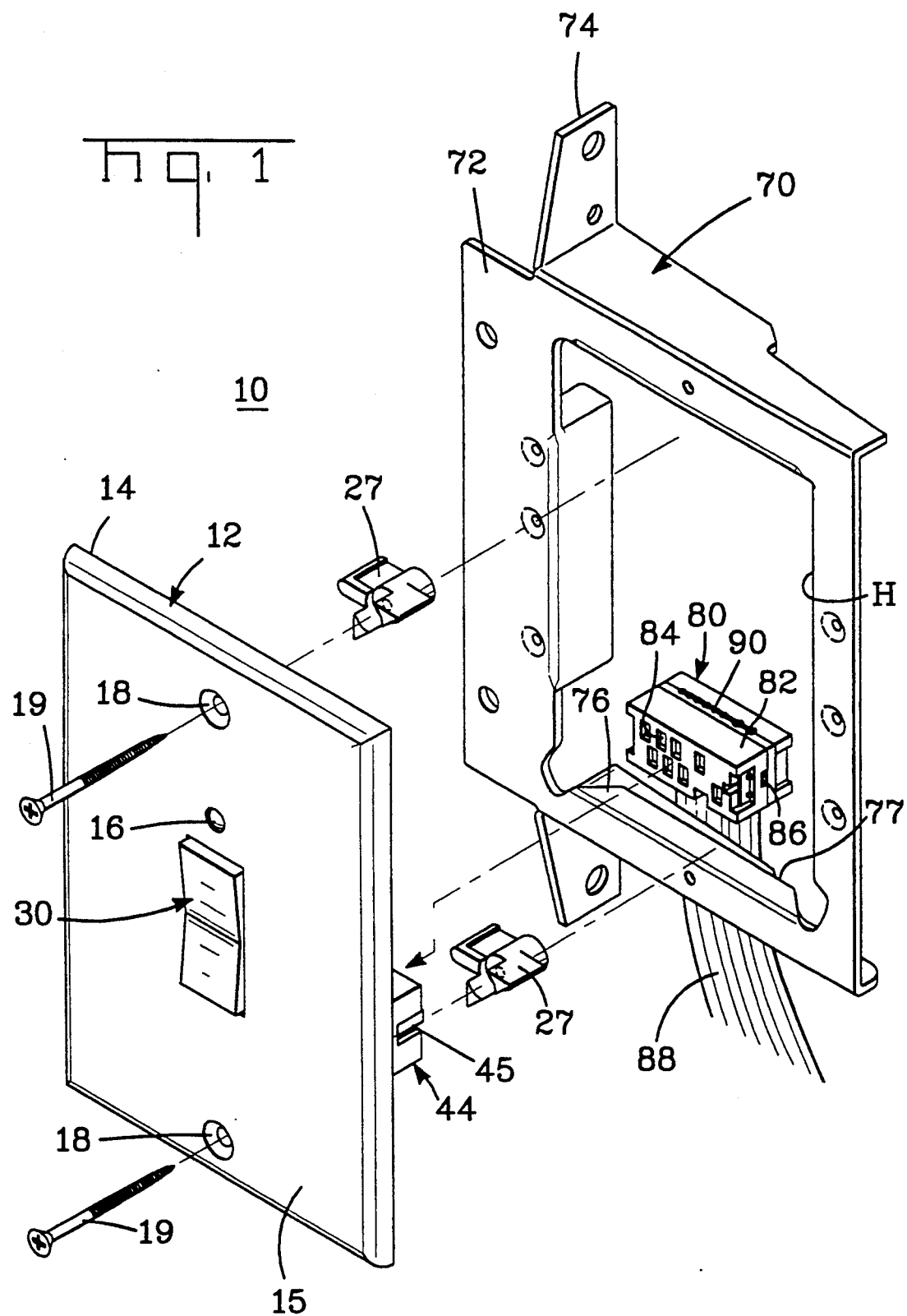
FIG. 1 is an exploded perspective showing a face plate carrying a switch, mounting anchors, and a mounting bracket, as well as a connector, for such switch.

In FIG. 1 an assembly 10 is shown to include a face plate wall switch 12, fasteners 19 and anchors 27, a wall bracket 70, and a connector 80 positioned behind such bracket. In typical use, the bracket 70 would be fitted to the stud of a wall and fastened thereto by fasteners applied through the holes in flanges 72 and 74 into the stud, all during the rough wiring prior to the installation of the interior wall. During rough-ins wiring signal wires would be installed within the wall cavity in a manner allowing access following the installation of the wall. Not shown in FIG. 1, but understood to be employed, is a wall covering the bracket 70 and anchored to studs to enclose the wall cavity. The hole H of the bracket 70 is typically used as a pattern allowing the removal of a portion of the wall contiguous with H. It is to be understood that the wall may very well be comprised of a number of different materials for different applications in light frame construction, from houses to factory-built modular homes. The wall may very well be ⅜ or ½ inch thick drywall or gypsum board, or ¼ inch or 4 mm thick plywood and/or composite board.

The switch 12 includes a body 14 molded of engineering plastic, such as ABS, to include a decorative front face 15 which, in many instances, is smooth and of a color to form an attractive part of the structure in which it is used. The switch 12 shown in FIG. 1, is a single position switch. It should be understood, however, that multiple position switches employing the same basic configuration may also be employed. The body 14 includes an aperture 16 to accommodate an indicator 50 as shown in FIG. 3 which indicates the condition of the switch 12 in terms of being on or off and in its different modes of use. A pair of apertures 18 are included at the top and bottom of the body 14 to accommodate screw type fasteners 19 inserted therethrough to engage anchors 27 carried by such fasteners and operable to lock the switch 12 to either a wall or to the bracket 70. In co-pending Application, identified as U.S. patent application Ser. No. 07/739,742 drawn to a blind mounting face plate and anchor means is incorporated herein by reference, the operation of a face plate like that of 12 with fasteners and anchors relative to walls and brackets is disclosed. Reference may be had to such Application for an understanding of the anchoring of the switch 12 in this Application.

In FIG. 2 it may be seen that the body 14 of switch 12 includes a central aperture 20 which serves to contain an actuator rocker 30, shown therermoved, and further, projections 22, 23, and 24, and 25 which extend away from the face 15 of the body 14. It will be noted that the projections 22, 23, 24 and 25 have wall portions contiguous with the surfaces of 15. By forming the walls in this manner flow marks or sink marks in face 15 proximate to aperture 20 are eliminated, much to the advantage of the appearance of the face plate. Furthermore, webs and other projections extending from the rear surface of the face plate intermediate its edges are eliminated so that the front appearance surface does not display such marks. The projections are molded integrally and simultaneously with the body 14 of the face plate part of the switch and include bearing surfaces 26 as shown in FIG. 2 centrally located of the aperture 20 and further include a series of posts 28 extending from the top edge surfaces of the wall projections 22, 23, and 24. The rocker 30 fits within aperture 20 with bearing surfaces 32 nesting in bearing surfaces 26 of the wall projections in a manner so that the actuator may be rocked by depressing, the top or bottom to actuate the switch. Rocker 30 includes as is shown in FIG. 3 a pair of projections 34 each having an upper portion 36 and transverse thereto a vertical portion 38 which includes an actuator surface 39 which serves to actuate a switch upon depression of the actuator 30.

Rocker 30 is held entrapped by engagement within the bearing surfaces 26 by virtue of a printed circuit board 40 attached to the wall projections 22, 23, and 24 by posts 28. These posts are extended through a series of holes 42 in board 40 and reflowed as by ultrasonic heat into the condition shown with respect to the portion 28 of projection 23 in FIG. 3. As can be seen, there are some six projections 28 which fit in six holes 42 in board 40 to lock the board to the projections and thus to the switch 12. A spring element 33 is carried by a projection 31 in the manner shown in phantom in FIG. 3 to bear against the upper surface of board 40 and drive the rocker 30 outwardly to prevent any looseness or rattle of the rocker in use. The dimensions of the projections 22, 23, and 24 relative to board 40 are such as to cause the projection surfaces 39 to bear against the switches 58, the upper surfaces thereof, without deflecting such switches until the rocker is actuated to initiate a switch action. It should be understood that a push button actuator could also be mounted within a box formed by walls projecting from the face plate.

Board 40 further includes a connector 44 mounted on the rear surface thereof which, in the embodiment shown, includes some eight posts 46 which may be rectangular solid conductive posts arranged in the two rows as indicated in FIG. 2, the ends of which are shown there soldered to traces on board 40. These traces shown as 48 interconnect the connector 44 to various components on board 40. FIG. 3 illustrates that a portion of wall 25 may be shortened to provide additional space to accommodate posts extending from the connector 44. FIG. 2 and FIG. 3 also show an indicator lamp 50 which may be an L.E.D. made to indicate the..mode of operation of the switch. Auxiliary capacitors 56 can be employed if switch bounce is a problem. The lamp 50 is interconnected by traces on board 40 to appropriate circuits thereon. As can be seen in FIG. 2, a number of terminal ends 52 are soldered to the traces on the board and as can be seen in FIG. 3, those terminals have bodies 54 which allow the termination of separate wires to the board and to the switch as an alternative mode of operation for the switch from cable conductors not shown. The preferred embodiment of this invention employs BARREL terminals. BARREL is a trademark of AMP Incorporated.

Each of the printed circuit board switches 58 includes a thin metallic spring element 59 rounded as is shown in FIG. 3 and terminated to the board by integral post portions 60 extended through holes in the board and soldered to traces of the board as shown in FIG. 2. There is a separate short post shown as 62 for each switch also soldered to a trace on the board which has a head projecting beneath the springs 59 so as to be normally disconnected therefrom. The preferred embodiment hereof utilizes Clicket Switches manufactured by AMP Incorporated. In practice, with the switch assembled in the condition shown in FIG. 3, depression or rocking of the rocker 30 will cause the surfaces 39 to deflect the springs 59 causing them to contact 62 and interconnect electrically the traces leading to springs 59 with the traces leading to button 62 to effect a switch function. As can be appreciated, depression of the rocker 30 in one direction will close one switch, as for example the upper switch shown in FIG. 2 and in FIG. 3 and an opposite depression of rocker 30 will depress and cause contact of the lower switch. To be understood is that these switch closures are momentary, as soon as pressure is removed from the rocker 30, the spring force of the switches, namely springs 59, will drive the rocker back to the neutral position shown in FIG. 3.

The keyboard switches formed by springs 59 and buttons 62 are located on the printed circuit board 40 at a position within the box formed by the wall projections 22, 23, 24 and 25. The printed circuit board 40 encloses one end of this box and the actuator such as rocket 30 substantially encloses the other end of this box. The keyboard switches are therefore substantially enclosed within a box. This box configuration limits the amount of dust or other particulate contamination to which the keyboard switches are exposed, to enhance their operation over an extended period. This protection is especially important since the wall switch is installed in the field as part of an inherently dusty operation.

Connectors 44 are standard headers containing simple post terminals in a plastic shroud which includes at the ends latches 45. The connector shown in FIG. 1, connector 80, includes a housing 82 having a series of cavities 84 which receive the posts of connector 44 and contain receptacles therefor therein. Structures 86 on the ends of the connector 80 receive the latches 45 of a connector 44 to allow the connector 80 to be latched to the connector 44 during installation of the switch. In practice, the connector 80 is withdrawn through the hole H of the bracket and through a wall and plugged into the connector 44 with the switch thereafter being installed and fastened to the wall or bracket 70. As can be discerned, connector 80 is terminated to a ribbon wire 88, the ends of the wire can be seen as 90 in FIG. 1. It is to be understood that the connector 80 is of a type which may be terminated to the end of a multi-wire cable 88 or, in a center span of such cable, in a T-type termination. Although the keyboard switches employed in the preferred embodiment of this invention are normally open switches, it should be understood that the same inventive elements could be employed with a normally closed switch configuration.

We claim:

1. A wall switch including a face plate having a planar body with a decorative face facing outwardly of a wall and of an area adapted to cover over a hole in the wall in which the wall switch is mounted, said face plate including an aperture having peripheral edges, the body including walls integrally joined to said peripheral edges of said aperture and extending to free ends thereof, said walls extending in a direction substantially perpendicular to said face plate, an actuator rocker fitted in said aperture, a board having a switch with normally open contacts thereon, said board being mounted on said free ends of said walls and engaging said actuator to hold said actuator in position within said aperture, said contacts being operable by depression of said actuator to effect a momentary switch action, circuit means carried on said board to generate switching signals from said switch responsive to switch closure and means on said face plate to anchor said face plate to a wall.

2. The wall switch according to claim 1 wherein the said contacts include spring elements positioned to be deformed by operation of said rocker from a first position to a second position to effect a circuit closure and operable to drive said rocker from the second to the first position to effect an opening of said circuit.

3. The wall switch according to claim 1 wherein projections extend directly from said free ends of said walls, with said board being mounted on said projections.

4. The wall switch according to claim 1 wherein said board includes mounted thereon a connector including terminals adapted to interconnect to a connector carrying wires within said wall.

5. The wall switch according to claim 1 wherein said board includes a series of components thereon including an indicator lamp and said planar body includes an aperture aligned with said lamp to provide an indication of switch condition.

6. The wall switch of claim 1 wherein the said board has a series of terminals mounted thereon adapted to be interconnected to effect a mode of operation of switch action caused by contact closure.

7. The wall switch of claim 1 wherein said walls include a pair of opposing walls located on opposite sides of said aperture and having opposing recesses in said free ends defining bearing surfaces.

8. The wall switch according to claim 7 wherein said rocker includes complementary bearing surfaces engaging the bearing surfaces on said pair of opposing walls.

9. A wall switch including a printed circuit board with at least one keyboard switch mounted on the printed circuit board, the wall switch including a one-piece molded face plate having an aperture having peripheral edges the face plate including walls integrally joined to said peripheral edges of the aperture to form four sides of a box, said walls extending to free ends thereof, said walls being substantially perpendicular to said face plate, a switch actuator being located within said box and enclosing a front of the box, the printed circuit board being secured to said free ends of said walls to enclose a rear of said box and hold said actuator within said aperture wherein the keyboard switch is located within said box.

10. The wall switch of claim 9 wherein said faceplate and walls are molded in one piece.

11. The wall switch according to claim 9 wherein the actuator is a rocker.

* * * * *